(12) United States Patent
Dam

(10) Patent No.: US 8,061,196 B2
(45) Date of Patent: Nov. 22, 2011

(54) BOTTOM UP CONTACT TYPE ULTRASONIC CONTINUOUS LEVEL SENSOR

(75) Inventor: Naim Dam, Muttontown, NY (US)

(73) Assignee: Cosense, Inc., Hauppauge, NY (US)

( * ) Notice: Subject to any disclaimer, the term of this patent is extended or adjusted under 35 U.S.C. 154(b) by 416 days.

(21) Appl. No.: 12/315,149

(22) Filed: Dec. 1, 2008

(65) Prior Publication Data
US 2010/0132453 A1 Jun. 3, 2010

(51) Int. Cl.
*G01F 23/00* (2006.01)
(52) U.S. Cl. ..................................... 73/290 V
(58) Field of Classification Search ............... 73/290 V
See application file for complete search history.

(56) References Cited

U.S. PATENT DOCUMENTS

| | | | |
|---|---|---|---|
| 5,119,676 A * | 6/1992 | Bower et al. | 73/290 V |
| 2005/0284217 A1* | 12/2005 | Miyagawa et al. | 73/290 V |
| 2009/0038394 A1 | 2/2009 | Zachmann | |

FOREIGN PATENT DOCUMENTS

| | | |
|---|---|---|
| JP | 11-153471 A | 6/1999 |
| JP | 2004-294073 A | 10/2004 |
| JP | 2004-340911 A | 12/2004 |
| RU | 2010180 C1 * | 3/1994 |

* cited by examiner

*Primary Examiner* — Hezrone E Williams
*Assistant Examiner* — Alex Devito
(74) *Attorney, Agent, or Firm* — Gordon D. Coplein

(57) ABSTRACT

An ultrasonic sensor for measuring the level of liquid in a vessel has an elongated tubular probe, a tube within the probe, and a transducer that converts electrical energy to ultrasonic energy mounted at or near one end of the tube so as to transmit ultrasonic energy horizontally across the probe. An element having a surface that reflects ultrasonic energy is at an angle, preferably of about 45°, to the probe longitudinal axis opposite to an ultrasonic energy emitting part of the transducer to reflect ultrasonic energy received from the transducer upwardly in the probe to an air-liquid interface from which it is downwardly reflected to the angled reflector element that directs the energy reflected from the interface back to the transducer for conversion to an electrical signal that is used by an electronic module to measure the liquid level in the probe which is the liquid level in the vessel.

7 Claims, 3 Drawing Sheets

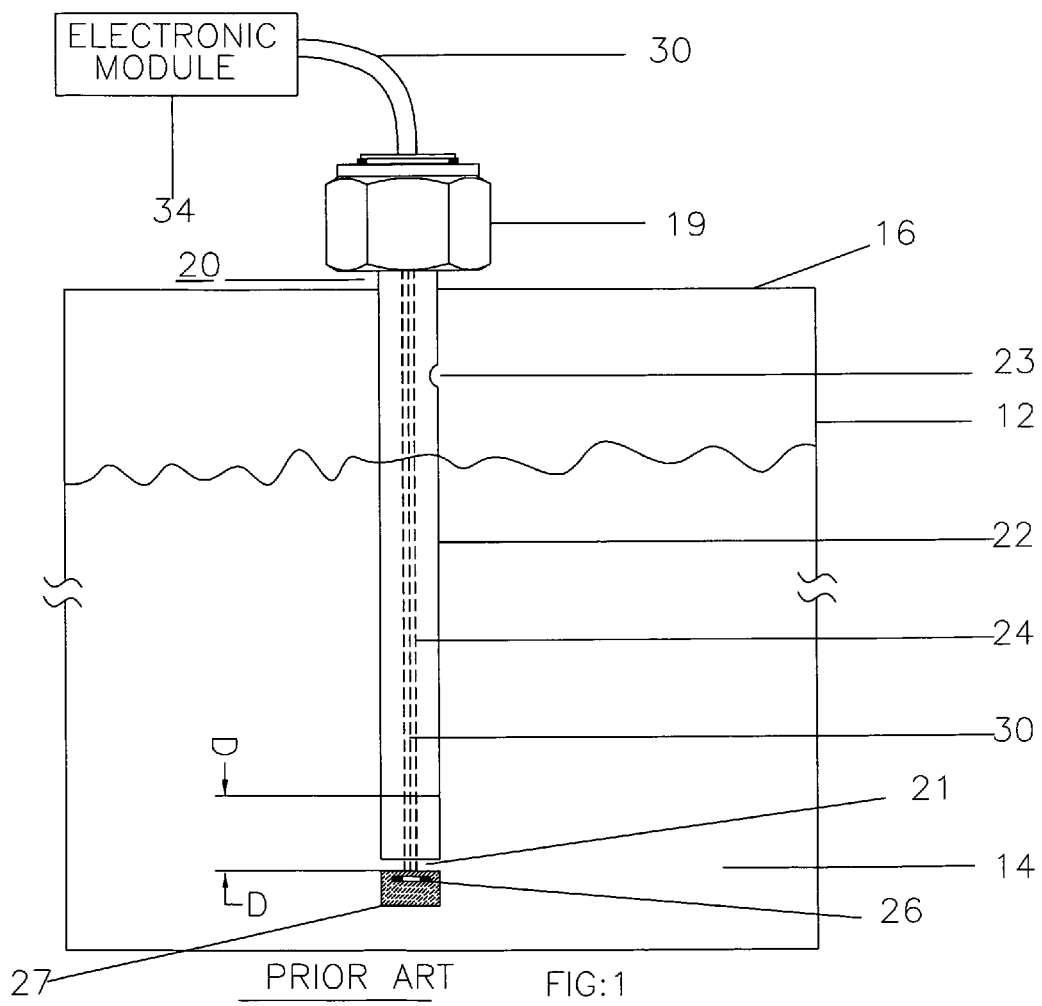

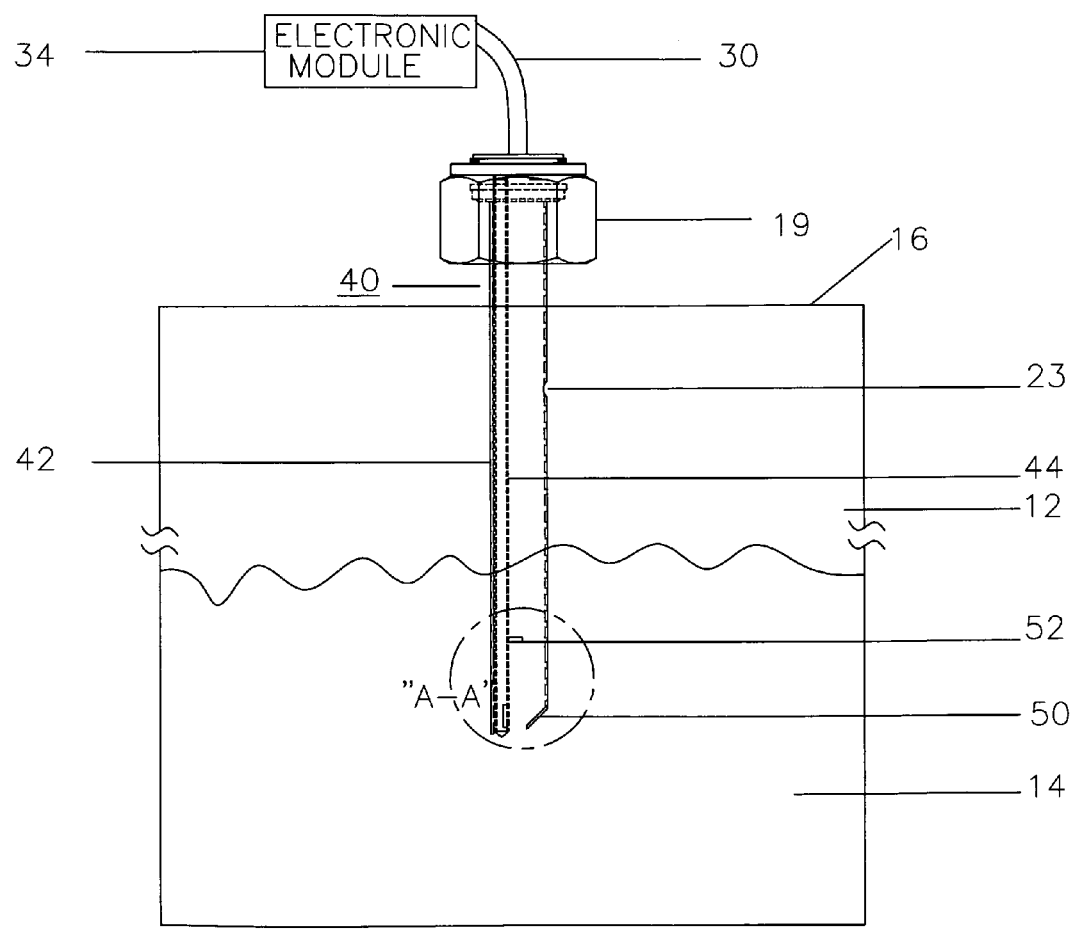
FIG:2

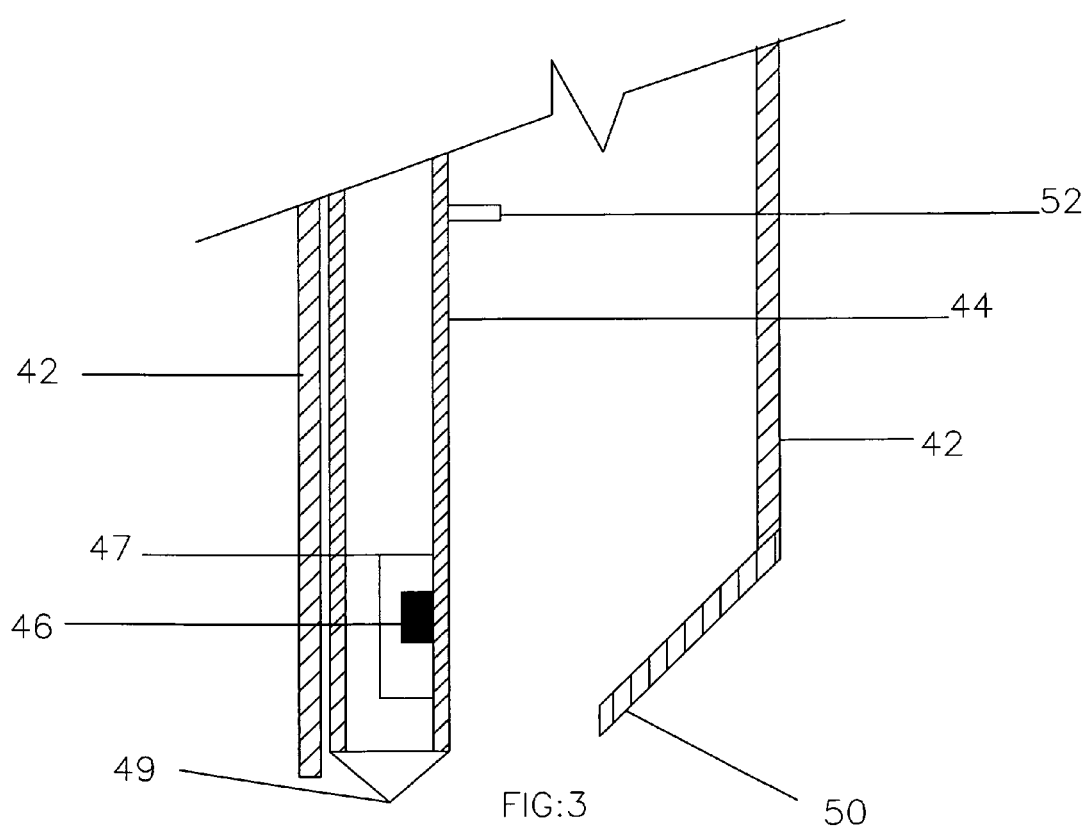
FIG:3

BOTTOM UP CONTACT TYPE ULTRASONIC CONTINUOUS LEVEL SENSOR

FIELD OF THE INVENTION

The invention is directed to a bottom up ultrasonic sensor that provides continuous detection of liquid level within a vessel with a reduced dead zone of measurement at the vessel bottom.

BACKGROUND OF THE INVENTION

Ultrasonic sensors for continuously or intermittently measuring the level (height) of a liquid within a vessel are well known. The liquid can be of any type including different types of chemical and high purity liquids used in the manufacture of semiconductors. Such sensors have a transducer located close to the bottom of the vessel that transmits a beam of ultrasonic energy upwardly to the liquid surface. The sensor transducer is most often mounted at the bottom end of an elongated probe that extends within the vessel. The ultrasonic energy is transmitted from the bottom end of the probe and is reflected from the liquid surface and received back at the transducer. The round trip transit time of the beam of energy is measured and if the velocity of the ultrasonic energy in the liquid is known the vessel's liquid level can be determined.

FIG. 1 shows the construction of a typical prior art bottom-up contact type sensor of the type discussed above. There is a vessel 12 of a material that is compatible with the liquid 14 that it contains. The vessel 12 can be of any height as needed for the application that it serves and has a top wall 16 on which a header 19 of the ultrasonic sensor 20 is mounted. The mounting arrangement shown is illustrative and the sensor 20 can be suspended from the outer edge of the vessel. A probe 22 extends downward from the header 19 into the vessel. The probe 22 is most often a cylindrical tube of a material that is compatible with the liquid 14. Stainless steel is suitable probe material for many applications although probes of different types of plastic also are used. The probe 22 has a vent hole 23 near its upper end somewhat below the vessel top wall 16.

An inner tube 24 also is suspended from the header 19 and extends to or somewhat past the lower end of the probe 22. The tube 24 also can be of stainless steel or plastic. A housing 27, typically of stainless steel or plastic, is attached to the lower end of tube 24 that contains the transducer element 26. Transducer 26 usually is of a piezoelectric ceramic material such as PZT (lead-zirconate-titanate). There is a space 21 between the housing 27 and the lower end of probe 22 so that the vessel liquid 14 can enter the probe 22 and rise to the same level as the liquid in the vessel. Wires 30 extend from an electronic module 34 outside of the vessel, through the header 19 and within the tube 24 to the transducer 26. The electronic module 34, which also can be mounted on the header 19, contains the necessary conventional components and circuits to provide pulses or bursts of electrical energy to the transducer 26. The transducer converts the electrical energy into ultrasonic (electromechanical) energy and transmits this energy upwardly (vertically as shown in FIG. 1) in the probe 22 toward the header 19. The upwardly transmitted ultrasonic energy is reflected from the interface of the liquid 14 and air, or other gas, downwardly back to the transducer 26 which converts the received ultrasonic energy back into electrical energy signals that are supplied to the electronics module 34. The circuits in the electronics module 34 includes a microprocessor that controls production of periodic pulses or bursts of pulses of electrical energy by a power amplifier that are supplied to the transducer 26. The microprocessor also computes the round trip time of the transmitted and received reflected ultrasonic energy in the probe 22 and from this calculates the level of the liquid in the probe 22 which is the level of the liquid in the vessel 12. The electronics module also can have a display which reads out the level measured. The module 34 also can transmit measurement information to another device such as a control circuit that turns a supply of liquid to the vessel on and off.

While the prior art sensor 20 of FIG. 1 is operative it has several disadvantages. In a typical sensor the housing 27 requires a minimum height of 3/8" to 1/2 to encapsulate the transducer 26. This means that the level of the liquid 14 in the vessel cannot be measured below the housing height. Sometimes the vessel is constructed with a well below its bottom wall into which the housing 27 can extend to eliminate the measuring problem caused by the housing height. But this adds expense in the construction of the vessel and can make its mounting more difficult. Also if liquid stays on the top portion of housing 27 which encapsulate the transducer 26 this may provide a false indication. Another disadvantage is that a characteristic of PZT material is such that it "rings" when an energy pulse or burst of pulses is applied to it. The ringing time is as long as 30/40 microseconds. Because of the ringing, as the transducer transmits energy in a direction vertically upward along the probe longitudinal axis a "dead zone", shown by the lines D-D, occurs between the upper end of the transducer housing 27 and a point within the probe 22. The duration of the transducer ringing does not allow level measurement in the "dead zone", which can of a height as large as 3/4" to 1".

Because of the problems described above the prior art sensor 20 is unable to measure the liquid level to the bottom of the vessel. Accordingly, it would be desirable to provide a sensor that can overcome the disadvantages of the prior art bottom up type sensors so that a more accurate measurement of liquid closer to the bottom of the vessel can be made.

BRIEF DESCRIPTION OF THE INVENTION

In accordance with the invention an ultrasonic bottom up sensor for measuring the level of liquid in a vessel has an elongated tubular probe extending from a header mounted to the vessel. A tube is within the probe and a transducer that converts electrical energy to ultrasonic energy is mounted at or near the lower end of the tube. The transducer is mounted to the tube in a manner such that it transmits ultrasonic energy horizontally across the probe and generally transverse to the probe longitudinal axis instead of vertically as in the prior art sensor. Wires are within the tube to convey electrical energy signals from an electronics module to the transducer and from the transducer back to the electronics module.

An element having a surface that reflects ultrasonic energy is mounted on the probe at an angle, preferably of about 45°, to the probe longitudinal axis and opposite to an ultrasonic energy emitting and receiving part of the transducer. The angled reflector element receives the ultrasonic energy transmitted by the transducer horizontally in the liquid in the probe and directs it upwardly within the probe to the air-liquid interface. The reflector element receives the energy reflected downwardly from the interface and directs it back to the transducer for conversion to an electrical signal that is used by the electronics module to measure the ultrasonic energy round trip travel time and from this to calculate the vessel liquid level.

The sensor of the invention eliminates the problems of prior art sensors since no transducer housing is needed that extends from an end of the tube within the probe. This eliminates the need for a well at the vessel bottom. The sensor also reduces the dead zone caused by transducer ringing since the ultrasonic energy is transmitted horizontally, transverse to the probe longitudinal axis, and parallel to the liquid surface instead of vertically upward as in the prior art sensor. The sensor of the invention can provide as small as a ¼" dead zone.

BRIEF DESCRIPTION OF THE DRAWINGS

Other objects and advantages of the present invention will become more apparent upon reference to the specification and the annexed drawings in which:

FIG. 1 shows a prior art sensor;

FIG. 2 shows a sensor design of the invention in a partial cross section view; and FIG. 3 is an enlarged view of the lower end A-A of the probe of the sensor of FIG. 2.

DETAILED DESCRIPTION OF THE INVENTION

Referring to FIGS. 2 and 3, the same reference numbers are used for the same components as in FIG. 1. Here also there is vessel 12 having a top wall 16 that contains a liquid 14. A hollow tubular probe 42 is suspended within the vessel from the header 19 mounted to the vessel top wall 16. The probe 42 is of any suitable material such as stainless steel or plastic. The probe 42 also has a vent hole 23. A tube 44 extends from the header 19 within probe 42. The tube 44 can be attached to an inner wall of the probe 42. The tube 44 also is of a suitable material such as stainless steel or plastic.

As seen best in FIG. 3, a transducer 46, preferably a PZT piezoelectric crystal, is in a housing 47 that is mounted to tube 44 near its lower end. The transducer housing 47, such as of an epoxy, is shown mounted to the inner wall of tube 44 at a point on its circumference that opposes the inner wall of probe 42. In another arrangement a window can be cut in the tube 44 in which the transducer housing is mounted. The transducer 46 is mounted in the tube 44 so that it emits energy horizontally away from tube 44 toward the opposing wall of probe 42. Wires 30 are within tube 44 having one end connected to the transducer 46. The wires extend in the tube 44 through the header 19 to the electronic control unit 34. The bottom end 49 of the tube 44 is sealed such as by an epoxy or a welded piece of stainless steel.

A part of the circumference of the lower end of probe 42 is cut away at a point somewhat above the part of the transducer 46 mounted on tube 44 that emits the energy. The cut away can be from about 180° to about 270° of the probe 42 circumference. A reflector element 50 is mounted at the end of the probe cut away part of the at an angle to the probe longitudinal axis and opposing the energy emitting face of the transducer 46. Element 50 can be disc shaped and has a surface that can reflect the ultrasonic energy transmitted by the transducer 44. The mounting angle of element 50 preferably is 45° relative to the probe 42 longitudinal axis. The center of the energy emitting face of the transducer 56 preferably is aligned with the center of the angled energy reflecting element 50. Liquid in the vessel enters the probe through the space between reflecting element 50 and tube 44

In the operation of the sensor of FIGS. 2 and 3 an electrical energy signal pulse or burst of pulses is applied from the electronic module 34 to the transducer 46 which converts these pulses into pulses of ultrasonic energy. The ultrasonic energy pulses pass generally horizontally through the liquid in the probe 42 towards the angled reflective element 50. The ultrasonic energy that strikes reflector element 50 is reflected upwardly in the liquid in probe 42 along its longitudinal axis to the air-liquid interface within the probe from which it is reflected downwardly in the probe to the angled reflecting element. The downwardly reflected ultrasonic energy from the liquid surface strikes the angled reflecting element 50 and returns though the liquid in the probe to the transducer 46. The ultrasonic energy received by the transducer 46 is converted to electrical energy which is conveyed by the wires in tube 44 to the electronic module 34 which calculates the liquid level in the probe 42 thereby to calculate the vessel liquid level.

An advantage of the sensor 40 of FIGS. 2 and 3 is that it eliminates the housing 27 for the transducer 26 that extends below the end of the tube in the prior art sensor of FIG. 1. Therefore, no well is need in the vessel bottom wall. It also reduces the dead zone due to transducer ringing which now occurs in a direction parallel to the liquid level surface instead of transverse to it as in the case of the prior art sensor.

A problem arises in the accuracy of sensors due to the change of ultrasonic energy velocity in the liquid. This is caused by various external factors, such as temperature, or internal factors such as viscosity of the liquid. When the velocity of the energy changes due to such internal or external factors, the measured round trip time of the ultrasonic energy in the probe is not an accurate measurement of liquid level, or interface height, in the vessel. It therefore becomes desirable to provide an arrangement to compensate for such change of internal or external factors to provide a correction to round trip travel time measurement. To overcome this problem an optional reflective pin 52 is installed in probe 44 at a fixed calibrated distance from transducer 46 to compensate for the above mentions effect. In FIGS. 2 and 3 the pin 52 is mounted on the tube 44 outer wall. That is, the distance from the transducer to the pin 52 is known and the microprocessor in the electronic module uses the measured round trip time of ultrasonic energy from the transducer 46 to the pin 52 to adjust computation of the liquid level measured.

Specific features of the invention are shown in one or more of the drawings for convenience only, as each feature may be combined with other features in accordance with the invention. Alternative embodiments will be recognized by those skilled in the art and are intended to be included within the scope of the claims. Accordingly, the above description should be construed as illustrating and not limiting the scope of the invention. All such obvious changes and modifications are within the patented scope of the appended claims.

I claim:

1. A contact type ultrasonic bottom up liquid level sensor for measuring the level of a liquid in a vessel, comprising:

a member to be located at a point above the liquid in the vessel:

an elongated linear tubular probe having a top end mounted to said member to suspend said probe downwardly into the liquid in the vessel and a bottom end into which liquid in the vessel can enter said probe;

an elongated linear tube within said probe that extends substantially the entire length of said probe and has a sealed bottom end;

a transducer that converts electrical energy to ultrasonic energy mounted at or near said bottom end of said tube to transmit and receive ultrasonic energy though liquid in the probe in a direction generally transverse to the probe longitudinal axis;

a reflector element on said probe bottom end having a surface that is reflective to ultrasonic energy mounted at an angle to the probe longitudinal axis opposite to an ultrasonic energy emitting and receiving part of said transducer to receive ultrasonic energy transmitted from said transducer part across the interior of said probe and reflect said received energy upwardly within said probe to an air-liquid interface within said probe and to receive energy reflected from the interface and reflect said energy received from the interface across the interior of said probe back to said transducer part for conversion to an electrical signal; and wires within said tube to supply electrical energy to said transducer and to convey the electrical signal produced by said transducer outwardly of the vessel.

2. The sensor as claimed in claim 1 wherein said reflector element is mounted at an angle of about 45° to the probe longitudinal axis.

3. The sensor as claimed in claim 1 wherein the center of the energy emitting and receiving part of said transducer is aligned generally opposite to the center of said reflector element.

4. The sensor as claimed in claim 3 wherein said reflector element is mounted at an angle of about 45° to the probe longitudinal axis.

5. The sensor as claimed in claim 1 and further comprising a pin reflective to ultrasonic energy mounted within said probe at a fixed distance from said transducer from which ultrasonic energy from said reflector element is directed back to said reflector element.

6. The sensor as claimed in claim 1 and further comprising an electronics module that supplies electrical signals through said wires in said tube to said transducer for conversion to ultrasonic energy and uses the supplied electrical signals and signals returned from said transducer through said wires to measure the round trip travel time of the ultrasonic energy in the liquid in said probe.

7. The sensor as claimed in claim 1 wherein said tubing is provided with a vent opening to be located near the top end of the vessel.

\* \* \* \* \*